R. B. CRAIG.
MACHINE TOOL HOLDER.
APPLICATION FILED FEB. 25, 1911.

1,029,172.

Patented June 11, 1912.

2 SHEETS—SHEET 1.

Witnesses
C. K. Reichenbach.
Ida T. Stanley.

Inventor
Robert B. Craig,
By
Knight Bros.
Attorneys.

R. B. CRAIG.
MACHINE TOOL HOLDER.
APPLICATION FILED FEB. 25, 1911.
1,029,172.
Patented June 11, 1912.
2 SHEETS—SHEET 2.
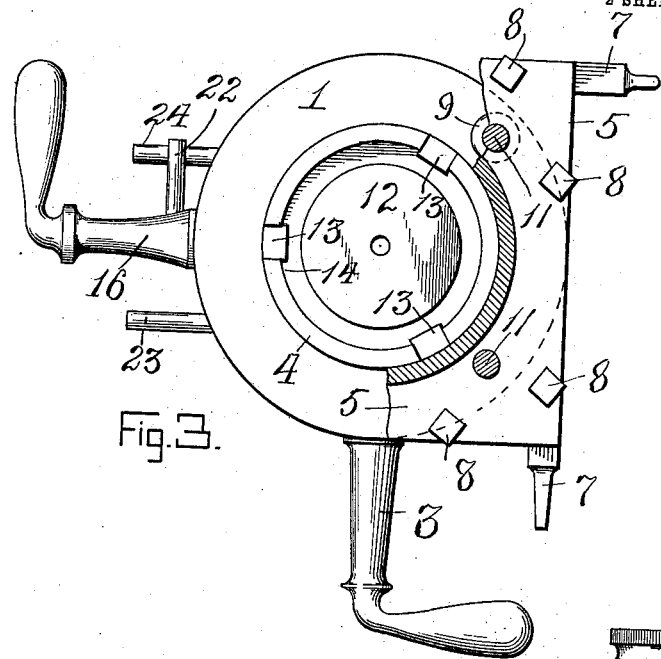
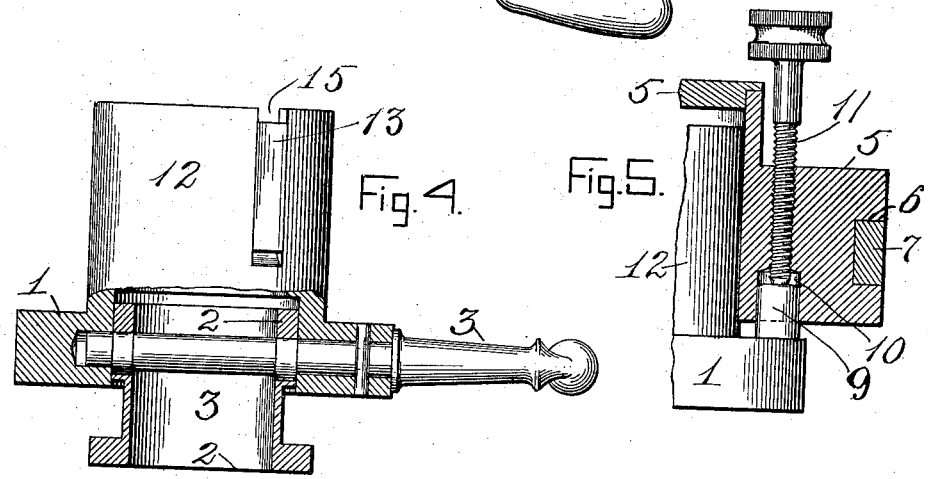
Witnesses
C. K. Reichenbach.
Ida T. Stanley,
Inventor
Robert B. Craig
By Knight Bros
Attorneys

UNITED STATES PATENT OFFICE.

ROBERT B. CRAIG, OF DAYTON, OHIO.

MACHINE-TOOL HOLDER.

1,029,172.  Specification of Letters Patent.  Patented June 11, 1912.

Application filed February 25, 1911. Serial No. 610,918.

*To all whom it may concern:*

Be it known that I, ROBERT B. CRAIG, a citizen of the United States, residing at 264 South Findley street, in the city of Dayton, county of Montgomery, and State of Ohio, have invented certain new and useful Improvements in Machine-Tool Holders, of which the following is a specification.

My invention relates to tool holders adapted to receive a plurality of different tools and to support them in such relation, on the carriage of the lathe or similar machine, as will permit of conveniently bringing into use any one of the tools so held, and will insure proper presentation to the workpiece of any tool called into service.

One object of the present invention is to provide an independent vertical adjustment for each one of the several tools carried by the holder.

Another feature incident to this object, consists in providing a rest common to all the stops, and locating it so that it coöperates with each stop only as the corresponding tool is brought to the working position.

Another object of the present invention is to have an absolutely fixed positioning of the holder and yet to have the holder readily releasable for its rotary movement in shifting from one tool to another.

A further feature consists in means for binding the rotary holder upon its bearing so that in addition to its being held against angular movement, the holder will be absolutely fixed against any vibration on its mounting.

A further object is to have the device conveniently operated with a minimum expenditure of time.

The tool holder is preferably in the form of a square head having lateral recesses providing supporting shoulders for the tools and set screws for holding the tools in their seats with ready removability and longitudinal adjustability. The entire tool holder is mounted on the carriage through means of a slide, which may be in the form of a T-head engaging in an undercut groove in the slide and adapted to be locked in any position of adjustment to and from the work piece by means of an eccentric shaft.

Figure 1:
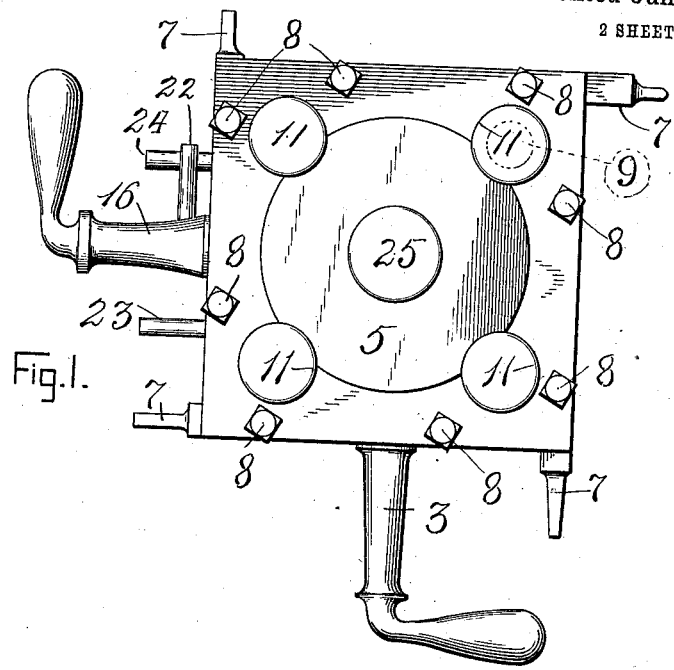
Figure 2:
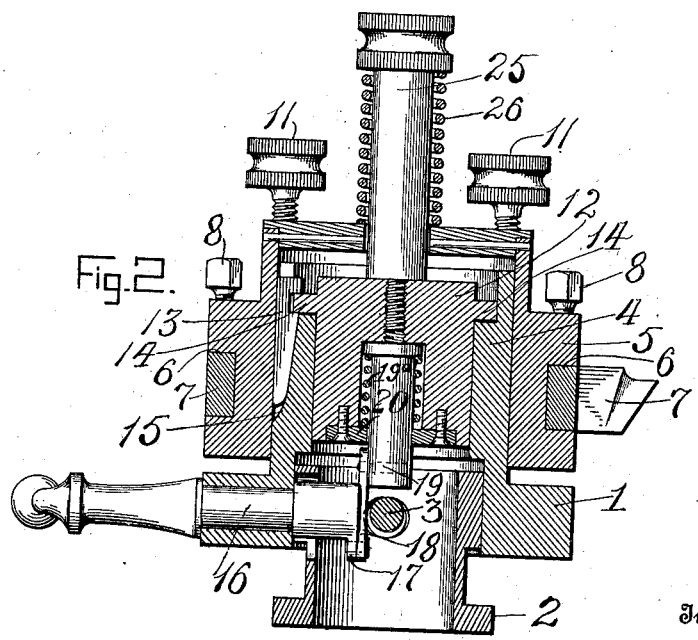

The invention will be fully understood upon reference to the accompanying drawings, in which, Figure 1 is a top view, and Fig. 2 a vertical section in the plane of the axis of the tool holder and of the setting shaft; Fig. 3 is a view similar to Fig. 1, with the rotary carrying member mainly broken away; Fig. 4 is a detail view of the mounting on the carrying member and the locking shaft for locking the slide to the carriage; and Fig. 5 is a detail view of the vertical adjustment of the carrying member.

On a slide 1, adapted to rest upon a standard type of T-slot carriage, is a vertically adjustable clamping jaw 2 under the control of a cam shaft 3, through means of which the tool holder may be locked in any angular position and at a distance relatively to the work. Upon the vertical cylindrical post 4 of the slide is mounted an angularly and vertically adjustable carrier 5, preferably having as many sides as there are tools to be mounted and with lateral recesses 6, in which tools 7 are secured by set screws 8 in position for presentation to the workpiece. A dowel 9 is adapted to enter either of a plurality of sockets 10, corresponding in number to the tools so as to lock the carrier against angular movement after any tool is brought into working position. To insure vertical adjustment of the carrier 5, there are as many set screws 11 as there are tools, preferably in position to impinge the dowel 9 whenever the corresponding tool is brought to working position, said set screws thus exerting no influence over the vertical adjustment except when their respective tools are in use, and thereby affording means for predetermining the height of any given tool whenever and however often it may be returned to working position, and permitting the use of any other tool in the interim without destroying the adjustment of the particular tool in question.

To bind the carrier 5 against vibration, a slide block 12 within the post 4 controls a plurality of wedging keys 13, through the medium of its annular flange 14 in such manner that whenever the block 12 is drawn downward the keys 13, sliding in their guideways 15, wedge in between the post 4 and the carrier 5 and make such parts, for the time being, as a single rigid structure. Upward movement of the block 12 withdraws the wedging keys 13 and leaves the carrier 5 free to be raised upon its post and thereafter rotated. For conveniently operating the block 12, I provide a crank shaft 16 whose crank 17 is connected through a pitman 18 with the shank 19 of the block 12, so that as the shaft 16 is rotated, the block 12 may be raised and lowered for the purposes already explained. Shank 19 may be rotatable relatively to the block 12, as shown, for which purpose, it is fitted in the socket of the block 12 and secured therein by a plate 20. In order that pressure imparted to the wedging keys may be equalized and properly proportioned, even though the keys may not always move the same distance vertically and at the same time to permit a complete throw of the crank shaft in the direction of seating, shank 19 is vertically movable in the block 12 and has a spring 19$^a$ introduced between its head and the plate 20 so that the shank 19 may yield downwardly after the block 12 is arrested. The strength of the spring 19$^a$ determines the pressure imparted to the wedging keys 13. To conveniently disengage the dowel 9 from a socket 10 after the binding keys are released, the parts are proportioned so that the first part of the rotation of the shaft 16 relieves the binding keys and the latter part thereof raises the block 12 until it impinges the carrier 5 and moves the latter upward sufficiently to disengage the dowel and socket. The shaft 16 being then just past dead center and its further rotation being arrested by the arm 22, impinging the stop pin 23, the block 12 will be held elevated and afford a turning support for the carrier 5 until the proper tool is brought to the working position, after which the rotation of shaft 16 is reversed to permit a new socket 10 to drop over the dowel 9, which parts can be brought to register by slight rotation of the carrier, whereas a further turning of the shaft 16 will again seat the wedging keys 13 to bind the carrier in place. In order that shaft 16 may yieldingly force the carrier downward and permit of the carrier being arrested at different heights without interrupting the full throw of the shaft and the complete binding movement of the binding keys, block 12 has an extension 25, which affords abutment for the upper end of the spring 26 whose lower end rests against the carrier 5. Extension 25 is conveniently provided by threading the extension to the block 12, which construction likewise facilitates assembling the pressure spring between the extension and the carrier.

It is not necessary that the tool 7 assume the positions shown in the drawings. Ordinarily the side of the carrier opposite to the shaft 16 will be presented toward the work. For attacking the exterior of the work-piece, or for making an undercut in a direction away from the lathe chuck, the positions of the tools as shown in the drawing, will be correct. If, however, it is necessary to work against a shoulder or an inner surface, in a direction toward the chuck, any given tool can be readily changed from one side of the carrier to the other and cause it to project in a position at 90° to the position shown in the drawing.

A pin 24 in the path of the arm 22 limits the throw of the crank shaft in the direction of seating the rotary carrier and controlling block. Pins 23 and 24 are preferably, slightly below the axis of the shaft 16 so that the double throw of said shaft is slightly in excess of 180° and the crank on the inner end of the shaft is so positioned relatively to the arm 22 that when said arm is arrested by either of the pins 23 or 24, the crank will have slightly passed its upper or lower dead center and will resist either the gravitation of the rotary carrier, which is for the time being supported on the upraised block, or the resiliency of the spring 26, which exerts an upward pull on the block when the block is down and the carrier and wedging keys are seated.

I claim:—

1. A tool carrier comprising a base, a rotary tool carrier mounted on said base with vertical movement, an interlocking means comprising members carried respectively by the rotary carrier and the base and caused to interengage by relative vertical movement, wedging keys adapted to firmly bind the rotary carrier and base together after their rotary adjustment is determined, and means for seating and unseating said wedging keys, imparting movement to the rotary carrier in the direction to disengage the interlocking means, and having a resilient connection with said rotary carrier in the direction of seating the carrier and wedging keys.

2. A tool holder comprising a base, a tool carrier mounted on said base with rotary and axial movements, wedging keys having axial movement relatively to said parts adapted to bind them together after their rotary and vertical adjustments have been determined, a vertically movable block having connection with said wedging keys, whereby they move said keys to and from binding position and a spring connection between said block and the rotary carrier.

3. A tool holder comprising a base, a tool carrier mounted on said base with rotary and axial movements, wedging keys having axial movement relatively to said parts adapted to bind them together after their rotary and vertical adjustments have been determined, a vertically movable block having connection with said wedging keys, whereby they move said keys to and from binding position, an extension on said block projecting through the carrier and a spring interposed between the protruding end of said extension and the carrier, through which the block imparts movement to the carrier in the direction of seating.

4. A tool holder comprising a base, a rotary tool carrier mounted on said base and having vertical movement thereon, a lifting block adapted to raise the rotary carrier and affording a support for the carrier when raised, permitting its rotary movement and a yielding seating connection between said block and carrier.

5. A tool holder comprising a base, a rotary tool carrier mounted on said base and having vertical movement thereon, a lifting block adapted to raise the rotary carrier and affording a support for the carrier when raised, permitting its rotary movement and a yielding seating connection between said block and carrier comprising an extension from the block projecting through the carrier and the spring interposed between the protruding end of the extension and the carrier.

6. A tool holder comprising a base, a rotary tool carrier mounted on said base and having vertical movement thereon, a lifting block adapted to raise the rotary carrier and affording a support for the carrier when raised, permitting its rotary movement and a yielding seating connection between said block and carrier, and means for raising and lowering said block comprising a shaft having connection with the block, which moves beyond center when at the limit of its throw in order to hold the block against return movement.

7. In a tool holder, the combination of a suitable base, a tool carrier mounted on said base, a vertically movable block interposed between said base and tool carrier, wedging keys controlled by said block, a shank fitted in said block, a spring interposed between said shank and block and a crank shaft having controlling connection with said shank.

8. A tool holder having a base; a rotary tool carrier mounted on said base, having axial movement; clamping means for rigidly holding said tool carrier on said base after rotation to position the tool, comprising a plurality of vertically moving wedging keys engaging the adjacent faces on said base and said tool carrier, a central block having a central chamber and being provided with an annular collar engaging said keys in order to raise and lower them, a post seated in said chamber, a spring within the chamber acting to press the post upward in the chamber, a horizontal crank shaft seated in said base and having an external handle and link connection between said crank shaft and said post.

9. A tool holder having a base, a rotary tool carrier mounted on said base having axial movement, interlocking means comprising a dowel on the base and adjusting screws and sockets in the carrier, said dowel caused to engage one at the time of said screws and sockets by relative vertical movement; clamping means for rigidly holding said tool carrier on said base after rotation to position the tool, comprising a plurality of vertically moving wedging keys engaging the adjacent faces of said base and said tool carrier, a central block having a central chamber and being provided with an annular collar engaging said keys in order to raise and lower them, a post seated in said chamber, a spring within the chamber acting to press the post upward in the chamber, a horizontal crank shaft seated in said base and having an external handle and link connection between said crank shaft and said post.

The foregoing specification signed at Dayton Ohio this 4th day of Jany., 1911.

ROBERT B. CRAIG.

In presence of two witnesses:
H. BRAUM,
H. M. WALSH.

---

Copies of this patent may be obtained for five cents each, by addressing the "Commissioner of Patents, Washington, D. C."